Feb. 4, 1969    H. O. BROWN    3,425,424
APPARATUS AND METHOD FOR STRIPPING BRUSSELS SPROUTS
Filed Oct. 11, 1965

INVENTOR.
HUGH O. BROWN
BY Lyon † Lyon
ATTORNEYS

United States Patent Office 3,425,424
Patented Feb. 4, 1969

3,425,424
APPARATUS AND METHOD FOR STRIPPING
BRUSSELS SPROUTS
Hugh O. Brown, 2434 E. Santa Ysabel,
Fullerton, Calif. 92631
Filed Oct. 11, 1965, Ser. No. 494,634
U.S. Cl. 130—30　　　　　　　　　　　　　7 Claims
Int. Cl. A01d 45/00

ABSTRACT OF THE DISCLOSURE

An apparatus and method for severing brussels sprouts from their stalks comprising severing means having an opening therein for receiving a stalk. The severing means is substantially frusto-conical and has an arcuate opening therein. Driving means are coupled with the severing means for imparting a reciprocating motion thereto substantially coaxially with respect to the longitudinal axis of the stalk. The arcuate opening presents a relatively dull edge which severs the sprouts from the stalk.

---

This invention relates to an apparatus and method for removing Brussels sprouts from their stalks and more particularly to an improved apparatus and process for breaking or severing the sprouts from their stalks.

The Brussels sprouts plant forms an erect stalk generally one foot or longer from which buds develop into small heads or sprouts. These sprouts, because of their unique growth habit, are not easily removed by a machine. Typically, the matured sprouts are removed from their stalks manually by hand in the fields or after the stalks have been cut. The manual hand stripping of the sprouts from the stalks adds greatly to the cost thereof.

Various apparatus and methods have been devised for mechanically removing the sprouts from their stalks. Among these is an apparatus described in British Patent No. 956,028 published Apr. 22, 1964, wherein a cut stalk is fed through a hole in a board and subsequently engages a pair of rollers which pull the stalk through the board thereby shearing the sprouts from their stalk as the sprouts engage the periphery of the hole. Other machines have been devised utilizing rotating cutting blades coaxial with the stalk for shearing the sprouts from the stalk, while some means (typically rollers) is provided for pulling the stalk past the cutting blades. Examples of apparatus of this latter nature are found in British Patent No. 958,114 published May 13, 1964, and U.S. Patent No. 3,175,561. Although each of these prior apparatus provide a satisfactory means for removing the sprouts from the stalk and may be more economical in the long run than removing the sprouts from the stalk by hand, each is characterized by undue mechanical complexity, bulkiness, and cost of manufacture and operation.

An apparatus and method for stripping Brussels sprouts from their stalks which is a substantial improvement over the prior art is disclosed and claimed in my co-pending U.E. patent application, Ser. No. 469,644, filed on July 6, 1965. This application, the disclosure of which is incorporated herein by reference, teaches an apparatus and method for stripping Brussels sprouts in which the stalk is inserted into an opening in a chuck and the sprouts on the stalk are periodically engaged by a plurality of severing members to break or sever the sprouts from the stalk. Although this apparatus and method is relatively simple and inexpensive, I have invented an apparatus and method of even greater efficiency, simplicity and of low cost.

Accordingly, it is an object of the present invention to provide an improved apparatus and method for removing sprouts from their stalks and which is simple and inexpensive.

It is a further object of the present invention to provide an improved and efficient Brussels sprouts stripper.

An additional object of the present invention is the provision of an improved method of removing Brussels sprouts from their stalks in a simple and economical manner.

Another object of this invention is the provision of rugged apparatus for stripping sprouts which may be operated by relatively inexperienced personnel.

These and other objects, features and advantages of the present invention will be more apparent when considered in connection with the attached drawing in which.

According to the specific exemplary embodiment of apparatus constructed in accordance with the teachings of the present invention severing means having an opening therein is provided for receiving a Brussels spouts stalk. Driving means are coupled with the severing means for imparting a reciprocating motion thereto substantially coaxially with respect to the longitudinal axis of the stalk. Preferably, the opening is circular, but may be arcuate comprising only a segment of a circle or the like.

Figure 2A:
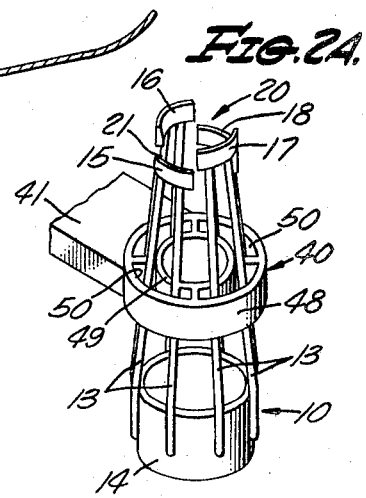
FIGURES 2A through 2C are perspective views of severing members according to the present invention.

Turning now to the drawing, exemplary apparatus according to the present invention includes a breaking or severing cone generally designated by reference numeral 10 and driving means generally designated by a reference numeral 11 for imparting reciprocating motion to the severing member. The severing cone 10 may be essentially frusto-conical in shape and includes a plurality of rods 13 affixed at their lower ends to the periphery of a ring 14 and affixed at their upper ends to a plurality of arcuate members 15 through 18 (note FIGURE 2A). The rods 13 preferably are formed of spring steel, and their lower ends are welded to the ring 14. The upper ends of pairs of rods may be welded to the respective arcuate members 15 through 18. Alternatively, adjacent rods 13 may be formed by bending a long rod into the shape of an inverted U with the legs thereof being welded to the ring 14 and the base thereof being formed, as by hammering, to provide the arcuate members 15 through 18.

As will appear subsequently, the severing cone 10 provides a variable opening 20 into which a Brussels sprout stalk is inserted, and the upper edges of the members 15 through 18 break, or sever, the sprouts from the stalk. It is not necessary that the upper edges, for example an edge 21 of the member 15, be sharp and typically these edges are approximately 1/32 inch thick. The upper edges of the members 15 through 18 serve to break the sprouts from the stalk, and if these upper edges were substantially sharp they may tend to cut into the stalk itself.

According to a feature of the present invention, Brussels sprouts are severed from a stalk by inserting the stalk into the opening 20 of the severing cone 10 and imparting reciprocating motion to the cone. Accordingly, the driving means 11 is coupled through a tube 23 to the ring 14. It will be appreciated that any of various apparatus may be used to impart reciprocating motion to the cone 10. Thus, the driving means 11 may take any of various forms, a modified air compressor being shown as exemplary. A shaft 24 of an electirc motor 25 is connected to a drive shaft 26 of an air compressor 27 through a coupling 28. The shaft 26 drives a piston 28 of the compressor 27 in a conventional manner. The cylinder and head of the compressor 27 have been removed and a cylindrical piston extension 29 is secured to the top of the piston 28. The upper end of the extension 29 is secured to a bracket 30 which in turn is secured to the lower end of the tube 23 by any suitable fastening means, such as screws. The upper end of the tube 23 likewise is secured to the ring 14 in any suitable manner, or the ring may be removably press-fitted into the end of the tube. A side portion of the tube 23 is cut away at 32 thereby providing an opening for the exit of stripped stalks. A deflector 33 preferably is secured near the lower end of the tube 23 and extends through the opening in the tube for deflecting the stripped stalks from the tube. The motor 25 and compressor 27 may be mounted on a base 34.

Preferably, the size of the opening 20 at the upper end of the severing member 10 may be manually controlled to accommodate different size stalks. This may be done by hand as a stalk is inserted into the opening, or mechanical adjustor means may be provided. For example, an aperture control ring or adjustor 40 is secured to an end of an arm 41 which is a part of or affixed to a control bar 42. A stirrup or foot pedal 43 is connected to the lower end of the bar 42. A support bar 44 is secured to the base 34. A ball bearing slide 46 is coupled between the support bar 44 and the control bar 42. Additionally, a return compression spring 47 is coupled between the bars 42 and 44. The spring 47 normally maintains the adjustor 40 in an upper position, the adjustor 40 being movable downwardly by pressure exerted on the foot pedal 43 as a stalk is inserted into the cone 10.

Figure 1:
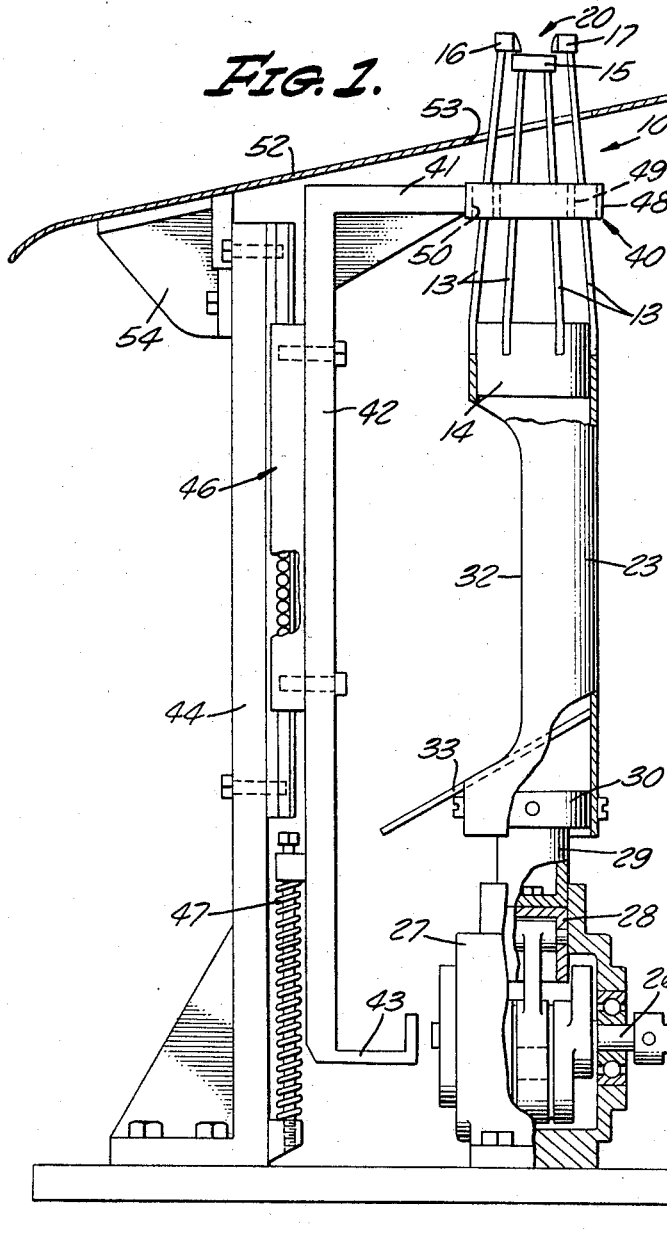
FIGURE 1 is an elevation view of exemplary apparatus constructed in accordance with the teachings of the present invention.

The adjustor 40 may be formed of outer and inner rings 48 and 49 which are secured together between rods 13. Thus, the ring 48 is adjacent the outside of the rods 13 and the inner ring 49 is adjacent the inside of the rods 13. The rods 13 extend through slots 50 between the rings 48 and 49 thereby allowing the adjustor 40 to freely move up and down. Preferably, the slots between the rings 48 and 49 through which the rods 13 extend are large enough so as not to cause the opening 20 at the top of the severing member 10 to change appreciably as the severing cone 10 is reciprocating up and down. A sprouts deflector 52 having an opening 53 may be attached to the bar 44 by a bracket 54 and positioned substantially as shown in FIGURE 1 to deflect the sprouts as they are severed from the stalk.

Figure 2B:
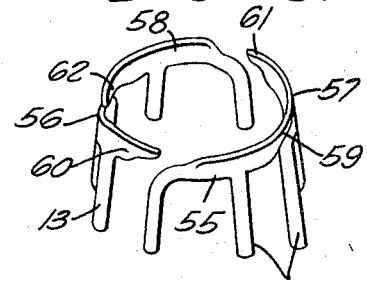
Figure 2C:
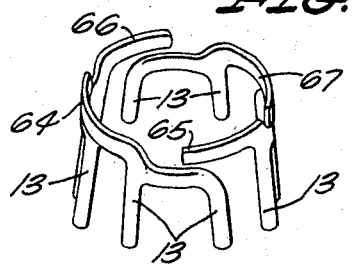

FIGURES 2B and 2C illustrate alternative configurations for the upper portion of the severing cone 10. In FIGURE 2B, arcuate members 55 through 58 may be formed with respective lips 59 through 62. Thus, the rods 13 may be bent to an inverted U-shape with the members 55 through 58 and lips 59 through 62 being formed at the base of the inverted U by flattening the same by hammering. In the arrangement shown in FIGURE 2C relatively long arcuate lips 64 through 67 may be formed as by welding short rod extensions at one side of the inverted U so that adjacent members overlap as shown. In each of the cone embodiments shown in FIGURES 2A through 2C, the arcuate members are arranged to provide a variable and substantially continuous arcuate opening 20 and to substantially eliminate interference between adjacent members. A fewer or greater number of members may be used and they may be longer or shorter. Likewise fewer or more rods 13 may be used. The rods 13 are preferable over a continuous sheet metal cone in order to reduce the friction with the stalk passing through the cone.

In stripping Brussels sprouts from their stalk, the stalk is inserted (preferably base first since the sprouts grow outwardly and upwardly from the stalk) into the opening 20 of the severing cone 10 as the cone 10 is reciprocating by the reciprocating motion imparted thereto from the piston extension 29 through the tube 23. The stalk may be guided into the opening 20 by hand, or a plurality of soft rubber guide rollers (not shown) may be positioned above the severing cone 10 to guide the stalk. As the stalk moves into the severing cone 10, the upper edges of the members 15 through 18 break or sever the sprouts from the stalk. As the sprouts are severed from the stalk, the stalk moves through the severing cone 10 and the tube 23 and is deflected outwardly by the deflector 33. The sprouts fall onto the upper surface of the deflector 52, and a suitable collecting means, such as a trough or pan, may be provided for collecting the sprouts. A plurality of severing cones 10 and tubes 23 may be reciprocated by individual compressor type devices or crank shafts driven by a single motor if desired. The crank shaft or shafts may be counter balanced to reduce vibration. Where a number of cones and driving crank shafts are used, the angular positions of the crank shafts may be staggered in a conventional manner to reduce vibration. The severing operation may take place in the field or at the packing plant.

The opening 20 at the upper end of the severing cone 10 preferably is variable between about one and two inches. The average Brusells sprout stalk is approximately one and one-half inch in diameter. The total height from the bottom of the tube 23 to the top of the severing cone 10 may be approximately two and one-half feet, with the tube 23 diameter being approximately two an one-half inches. A wide range of reciprocating speeds is possible, for example a one and one-fourth inch stroke at a motor r.p.m. of 1200, and a one-half inch stroke at a motor r.p.m. of 3000. At the former rate it has been found that substantially one hundred percent severing of the sprouts from an average stalk may be achieved in approximately two and one-half seconds.

Typically, the apparatus shown in FIGURE 1 is arranged upright as shown with the stalk being inserted downwardly into the opening 20 of the severing cone 10. However, the apparatus may be disposed horizontally, or in any other suitable position. Additionally, the opening 20 does not have to be circular, that is, does not have to present a continuous severing edge. Thus, one or more of the members 15 through 18 may be used to provide an arcuate edge which may comprise only a segment of a circle for example. In this case, the apparatus generally is disposed horizontally with the stalk being fed horizontally and rotated (as by hand) so that the end of the arcuate segment severs all of the sprouts around the periphery of the stalk.

It will be understood that although exemplary embodiments of the present invention have been disclosed and discussed, other applicatons and arrangements are possible and that the embodiments disclosed may be subjected to various changes, modifications and substitutions without necessarily departing from the spirit of the invention.

What is claimed is:

1. A Brussels sprout stripper for removing Brussels sprouts from a stalk comprising:
   severing means including a plurality of rods and arcuate severing members defining an aperture;
   support means having an opening in a first end communicating with an opening in the surface thereof, said first end of said support means being coupled to said rods for moving said severing members; and
   driving means coupled to said support means for moving said support means, and thus said severing means, in a reciprocating manner substantially along the longitudinal axis of said severing means.

2. A device as in claim 1 including aperture control means coupled with said severing means for moving said rods to vary the size of said aperture.

3. A Brussels sprout stripper for removing Brussels sprouts from a stalk comprising:
   frusto-conical severing means including a ring having a plurality of rods affixed thereto and extending therefrom, the ends of said rods remote from said ring having arcuate severing members defining an aperture for receiving a Brussels sprouts stalk;
   support means having an elongated opening in its surface communicating with a first end thereof, said first end of said support means being coupled with said ring; and driving means coupled to said support means for driving said support means and said severing means in a reciprocating manner substantially along the longitudinal axis of said severing means.

4. A Brussels sprout stripper for removing Brussels sprouts from a stalk comprising:

frusto-conical severing means including a ring having a plurality of rods affixed thereto and extending therefrom, the ends of said rods remote from said ring having arcuate severing members affixed thereto defining an aperture for receiving a Brussels sprouts stalk;

a tub having an elongated opening in its surface between the ends thereof, deflector means coupled to said tube and extending through the opening therein, and a first end of said tube being coupled with said ring; and driving means coupled to said tube for driving said tube and said severing means in a reciprocating manner substantially along the longitudinal axis of said severing means.

5. A Brussels sprout stripper for removing Brussels sprouts from a stalk comprising:

frusto-conical severing means including a ring having a plurality of rods affixed thereto and extending therefrom, the ends of said rods remote from said ring having arcuate severing members affixed thereto defining an aperture for receiving a Brussels sprouts stalk;

first deflector means having an opening therein through which said severing means extends for deflecting sprouts as they are severed from a stalk;

a tube having an elongated opening in its surface between the ends thereof, second deflector means coupled to said tube and extending through the opening therein for deflecting stalks as they pass through said severing means, and a first end of said tube being coupled with said ring; and driving means coupled to said tube for driving said tube and said severing means in a reciprocating manner substantially along the longitudinal axis of said tube and said severing means.

6. A Brussels sprout stripper for removing Brussels sprouts from a stalk comprising:

frusto-conical severing means including a ring having a plurality of rods affixed thereto and extending therefrom, the ends of said rods remote from said ring having arcuate severing members affixed thereto defining an aperture for receiving a Brussels sprouts stalk;

first deflector means having an opening therein through which said severing means extends for deflecting sprouts as they are severed from a stalk;

aperture control means coupled with said severing means for moving said rods to vary the size of said aperture;

a tube having an elongated opening in its surface between the ends thereof, second deflector means coupled to said tube and extending through the opening therein for deflecting stalks as they pass through said severing means, and a first end of said tube being coupled with said ring; and driving means coupled to a second end of said tube for driving said tube and said severing means in a reciprocating manner substantially along the longitudinal axis of said tube and said severing means.

7. A Brussels sprout stripper for removing Brussels sprouts from a stalk comprising:

frusto-conical severing means including a ring having a plurality of rods affixed thereto and extending therefrom, the ends of said rods remote from said ring having arcuate severing members defining an aperture for receiving a Brussels sprouts stalk;

aperture control means coupled with said severing means for moving said severing members to vary the size of said aperture;

a tube having an elongated opening in its surface between the ends thereof, a first end of said tube being coupled with said ring; and driving means coupled to a second end of said tube for driving said tube and said severing means in a reciprocating manner substantially along the longitudinal axis of said tube and said severing means.

References Cited

UNITED STATES PATENTS

| 206,364 | 7/1878 | Sprague | 130—9 |
| 247,718 | 9/1881 | Warfield | 130—9 |
| 2,798,833 | 6/1883 | Smith | 130—9 |
| 2,323,092 | 6/1943 | Kerr | 130—9 |
| 3,175,561 | 3/1965 | Oldershaw | 130—30 |

ROBERT E. BAGWILL, *Primary Examiner.*

U.S. Cl. X.R.

130—9